Feb. 13, 1934.  B GARLLUS  1,946,529
BOILER FEED WATER REGULATOR
Filed May 29, 1933
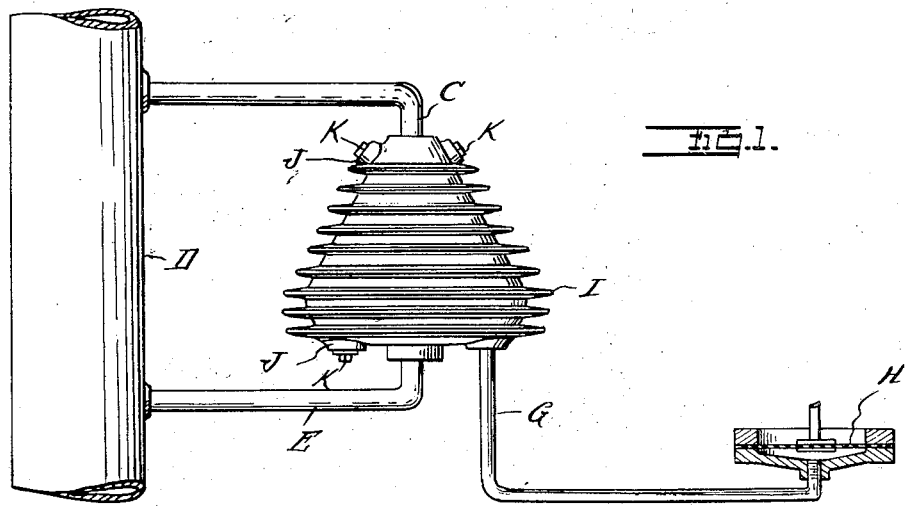
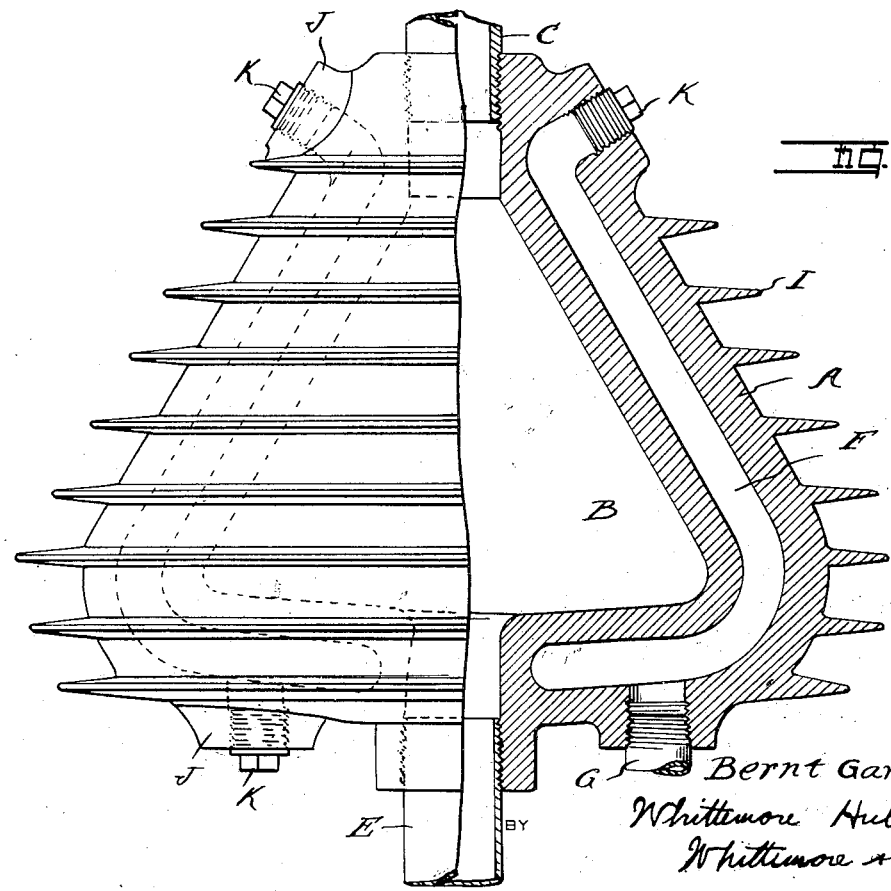
INVENTOR
Bernt Garllus
Whittemore Hulbert
Whittemore & Belknap
BY
ATTORNEYS Patented Feb. 13, 1934

1,946,529

UNITED STATES PATENT OFFICE 1,946,529

BOILER FEED WATER REGULATOR

Bernt Garllus, Detroit, Mich., assignor to Alexander J. McDonough, Detroit, Mich.

Application May 29, 1933. Serial No. 673,544

2 Claims. (Cl. 122—451.2)

The invention relates to boiler feed water regulators and consists in the novel construction as hereinafter set forth.

In the drawing:

Fig. 1 is a diagram illustrating my improved regulator in connection with the boiler;

Fig. 2 is a sectional elevation of the variable steam generator.

My improved regulator comprises essentially a casing having an inner chamber connected to the boiler above and below the normal water level therein, and an outer chamber surrounding said inner chamber containing a fluid which is expanded or contracted by variations in temperature, due to a depression or elevation of the water level in the inner chamber. To increase the extent of these variations, the casing is of a conical or downwardly enlarging form so that the amount of surface exposed to contact with steam of the boiler is progressively increased as the water level falls. This will produce a corresponding variation of pressure on the fluid by expansion of the fluid in the outer chamber which is utilized for the variable control of the water feed to the boiler. As specifically shown, A is the casing of conical form containing an inner chamber B which at its upper end is connected with the conduit C leading to the boiler or water column D above the maximum height of water level therein. The lower end of the chamber is connected by a conduit E with the boiler or water column below the low water level therein. Within the walls of the casing A is a surrounding chamber F which at its lower end is connected to a conduit G leading to a flexible diaphragm H or other means of varying the feed water to the boiler. As the specific construction of this means is not essential I have omitted illustration or description of the same. The outer wall of the casing A is preferably surrounded with a series of radiating fins I which assist in dissipating the heat therefrom.

With the construction as described, it will be obvious that the water level within the chamber B will rise or fall correspondingly with variations in the water level in the boiler. The water in the chamber will lose its heat by radiation, but the steam being under the same pressure as that in the boiler, will remain at substantially the same temperature. On account of the conical form the amount of surface in the wall surrounding the chamber B exposed to contact with the steam is very much less than the extended surface exposed to contact with the water, and the higher the water level in the chamber, the smaller will be the steam exposed surface. On the other hand, as the water level falls, the expanding diameter of the chamber will rapidly increase the amount of surface exposed to the steam.

Assuming that the outer chamber F contains a certain quantity of water or other expansible fluid, it is evident that the pressure of expansion will rapidly increase as the water level within the chamber B falls. This is due to the fact that the temperature of the wall intermediate the chambers B and F will rise with the increase of area of contact with the steam, and the heat thus imparted to this wall will be conducted to the chamber F where it will expand the fluid therein. In case the fluid in the chamber F is water, a portion of this will be converted into steam and the increased pressure due to such expansion will be conducted through the water in the conduit G to the flexible diaphragm H which will be actuated to regulate the water feed. On the other hand when the water level within the chamber B rises, the temperature of the fluid within the chamber F will rapidly fall due to radiation from the outer walls and from the fins I, and this by diminishing pressure upon the diaphragm H will occasion an opposite regulation of the feed water.

My improved regulator may be manufactured at low cost for the casing A with the chambers B and F therein may be formed by an integral casting suitably cored. The core supports extend out through lugs J and after removal of the cores all of these may be stopped by plugs K, with the exception of the one to which the conduit G is attached.

What I claim as my invention is:

1. In a boiler feed water regulator, a pressure generator comprising a casing of conical form having an inner chamber connected at the upper and lower ends respectively with the steam space and water space of the boiler and a surrounding outer chamber for containing an expansible fluid whereby the heat communicated from the inner to the outer chamber varies in proportion to the fall or rise of the water level in said inner chamber, and will correspondingly vary the pressure of said expansible fluid.

2. In a boiler feed water regulator, a pressure generator comprising a casing of conical form, having its walls surrounded with radiating fins, said casing having an inner chamber connected at its upper and lower ends respectively to the steam and water space of the boiler, and a surrounding outer chamber for containing an expansible fluid, the temperature of said expansible fluid being dependent on the difference between the heat losses through radiation and the heat conducted from the inner chamber whereby the temperature and pressure of said expansible fluid will be increased or diminished in proportion to the fall or rise of water level in the inner chamber.

BERNT GARLLUS.